United States Patent
Noller et al.

(10) Patent No.: US 6,570,526 B1
(45) Date of Patent: May 27, 2003

(54) SPEEDOMETER

(75) Inventors: Tilmann Noller, Morawitzkystrasse 2, 80803 Munich (DE); Stephan Jurende, Nymphenburgerstr. 213, 80639 Munich (DE); Arno Unkrig, Ferdinand-Miller-Pl. 10, 80335 Munich (DE); Robert Götz, Landsbergerstr. 457, 80241 Munich (DE); Horst Kaltschmidt, Neubiberg (DE); Rupert Christl, Munich (DE)

(73) Assignees: Tilmann Noller, Munich (DE); Stephan Jurende, Munich (DE); Arno Unkrig, Munich (DE); Robert Götz, Munich (DE)

( * ) Notice: Subject to any disclaimer, the term of this patent is extended or adjusted under 35 U.S.C. 154(b) by 0 days.

(21) Appl. No.: 08/776,745
(22) PCT Filed: Aug. 11, 1995
(86) PCT No.: PCT/EP95/03197
§ 371 (c)(1), (2), (4) Date: Jul. 10, 1998
(87) PCT Pub. No.: WO96/05520
PCT Pub. Date: Feb. 22, 1996

(30) Foreign Application Priority Data

Aug. 12, 1994 (DE) .......................... 44 28 663

(51) Int. Cl.[7] .................. G01S 13/60; G01S 13/42
(52) U.S. Cl. ................. 342/109; 342/104; 342/118; 342/192; 342/195; 342/196; 343/700 MS
(58) Field of Search ............... 342/61, 70–72, 342/104, 105, 192–197, 27, 28, 118–128, 109, 134, 135–144; 343/700 MS, 713; 327/31–38

(56) References Cited

U.S. PATENT DOCUMENTS 4,012,736 A  *  3/1977  Angwin ....................... 342/109
4,845,506 A  *  7/1989  Shibata et al. ............... 343/713

FOREIGN PATENT DOCUMENTS

| DE | 39 22 165 | 1/1991 |
| DE | 39 41 125 | 6/1991 |
| DE | 42 12 685 | 11/1992 |
| DE | 42 17 426 | 12/1993 |
| EP | 172 687 | 2/1986 |
| GB | 837 133 | 6/1960 |
| GB | 1 587 127 | 4/1981 |
| GB | 2 276 055 | 9/1994 |
| WO | 88/02494 | 4/1988 |
| WO | 90/01707 | 2/1990 |
| WO | 371 346 | 6/1990 |
| WO | 380 268 | 8/1990 |
| WO | 91/07642 | 5/1991 |
| WO | 0 594 119 | 4/1994 |

OTHER PUBLICATIONS

Kleinhempel et al. "Radar Signal Processing for Vehicle Speed Measurements" (1992) pp. 1829–1832.

* cited by examiner

Primary Examiner—Bernarr E. Gregory
(74) Attorney, Agent, or Firm—Scully, Scott, Murphy & Presser (57) ABSTRACT

A device for measuring the speed reached and the distance covered by a moving user or object has a Doppler radar sensor that may be secured to the moving user or object and is made of a microwave strip transmission line sensor (1) that generates measurement signals and supplies them to an evaluation unit (2) with a sender that transmits the evaluated data to a separate processing and display unit (8).

20 Claims, 5 Drawing Sheets

SPEEDOMETER

BACKGROUND OF THE INVENTION

1. Field of the Invention

The present invention concerns an unit for measuring the speed and traveled distance of a moving person or object with a Doppler Radar sensor.

In the modern recreational society, daily exercises and sports are for most people a definite part of life. The sports enthusiast can choose between a wide variety of sports such as jogging, bike racing, mountain biking, riding, skiing and so on. In most of these sports, there are no possibilities for the athlete to calculate and control his performance, specifically, speed and distance. Not only for the amateur, but especially for the professional, it is of great importance to be able to control and measure training expenditure and intensity during exercise. The best known and most accurate sensor to measure speed is the Doppler Radar Sensor which works on the basis of the so-called Doppler-Effect, according to which the frequency distribution between the source of radiation and the reflecting signal is directly proportional to the relative speed between the sensor and the reflecting object. Making use of this, either the sensor or the object, or both can move at the same time. Conventional Doppler Sensors are usually like a hollow resonator and built e.g. into cars or the like. They are usually relatively large, heavy and inconvenient. An object which would allow an athlete to measure and control his speed and distance during exercise does not exist.

2. Discussion of the Prior Art

The object of the present invention is to provide a unit for measuring speed and distance of a moving user or object with a Doppler Radar Sensor to enable the measurement, the control and the testing of the speed and traveled distance in a simple, exact way without hindering free movement.

This object is achieved by a unit in which the Doppler Radar Sensor is attachable to a moving user or object, and consists of a Microwave Strip Transmission Line Sensor which produces signals and guides them to an Evaluation Unit, said unit comprising a transmitter that sends analyzed data to a separate Processing and Display Unit. Here, the analyzed date are preferable sent via radio signals. It is also possible to realize transmission via conductors or wires, or to use the human body or the object as a transfer medium.

SUMMARY OF THE INVENTION

With an uneven speed or jerking movement of the user or object, the present invention produces measuring signals with interruptions and mistakes. It is therefore an additional object of the present invention to produce a process by which the unit of the present invention can produce accurate and reliable measuring signals even when the user or object is moving unevenly. This object is achieved by a unit and a process.

The used Microwave Strip Transmission Line Sensor is, for example, a sensor of the type used in the German patent applications DE 39 394 1125 and DE 39 22 165. Sensors of this type operate with high reliability, high accuracy and especially have little weight, are small in size and have acceptable production costs. The signal frequency of the Microwave Strip Transmission Line Sensor used in the present invention is preferably 5.86 Hz. The Microwave Strip Transmission Line Sensor is turned by 20° to 60° with respect to the ground normal. A part of the emitted radiation gets diffuse when it hits the ground and is then again received by the sensor. The frequency of the received signal is shifted with respect to the sending frequency. The differential frequency $\Delta f$ is proportional to the relative speed v between the moving user or object and the ground, and inversely proportional to the cosine of the angle $\alpha$ between Microwave Strip Transmission Line Sensor and the ground normal:

$$\Delta f \alpha / \cos \alpha$$

The Frequency Analysis of the Differential Frequency Signal for calculating the speed information in the Evaluation Unit is advantageously taking place through a Fourier Analysis or simply through a Zero Transition Counter.

Through the physical separation of the Microwave Strip Transmission Line Sensor and the Evaluation Unit from the Processing and Display Unit, a moving user is given the possibility to measure his own speed and traveled distance during movement. It is also possible to measure, control and analyze speed and traveled distance of a moving object, to which the Microwave Strip Transmission Line Sensor and the Evaluation Unit are fixed. This can be accomplished by moving with the object (bike or horse) or by a non-moving user having the Processing and Display Unit.

Since the Microwave Strip Transmission Line Sensor and the Evaluation Unit are attached and carried by a moving user or object, it is advantageous to build them small, light and easy to carry, so that it will not impede and interrupt movement. The separate Processing and Display Unit should preferably also be, small, light and easy to carry, if it is also to be carried by the moving user. Even if the one who carries the separate Processing and Display Unit does not move and wants to measure the speed and traveled distance of a moving object, it is advantageous to build the Processing and Display Unit small, light and easy to carry. This could e.g. be the case if a discus thrower or a javelin thrower (or a similar athlete) wants to measure the speed and traveled distance of his athletic instrument, even when he is not moving.

It is also possible to build the Processing and Display Unit in a stationary way, e.g. attached to a computer. This is advantageous when a trainer wants to control and analyze the performance of his athletes during training, and then immediately use these results in the training session. For these aplications the Processing and Display Unit can have a more extensive software and more user-friendly operating and displaying possibilities than the portable version.

It is advisable to secure the Microwave Strip Transmission Line Sensor and the Evaluation Unit in a casing with an elastic belt, buckle, clip or a similar device on the athlete or his clothing, e.g. on runners, ice skaters, long distance runners or athletes who perform a similar motion. The best place to attach the inventive object for the previously mentioned movements would be the hip, since it experiences the least amount of rocking. The sensor, when attached to the user or object, has to be built into a casing in such a way that the emitted signals will hit the ground at an angle. The separate Processing and Display Unit can be attached to the wrist of a moving user with a wrist band, so that the user can, at all times access and monitor the data.

It is also possible to combine the Microwave Strip Transmission Line Sensor and the Evaluation Unit with an Acceleration Sensor, which can be a semiconductor. This makes it possible to shut off the Microwave Sensor at a consistent speed and activate it only at a change of speed which will then be registered by the Acceleration Sensor thus reducing the power consumption of the present invention considerably.

Furthermore, a Temperature Compensation Pressure Sensor can be integrated for air pressure measurement, i.e. to calculate changes in air pressure or reached altitude. Since a speed signal to be measured through 1/COS α depends on an angle of inclination a between the radar signals and the reflecting surface, errors through the inclination of the surface can be compensated by the use of an integrated Altitude Meter. This is very important e.g. for a mountain climber or hiker. From the reached altitude and measured speed calculations, this can be used to determined the inclination of the surface and the true speed. With the Pressure Sensor calculations to determine the reached altitude and the speed of ascend and descend can be reported and recorded.

The present invention can also be constructed in a fashion that after completing the physical exercise all the speed values in a specific time frame stored in the Evaluation Unit or the Processing and Display Unit are transferred to a computer via an inductive interface for further analysis.

The present invention can be used for all athletic activities or other activities in which a user or object is moving. Specifically to be listed here are all kinds or running and walking exercises, also cross-country skiing, alpine skiing, ice skating, roller skating and roller blading, biking, bobsledding, all kinds of equestrian sports, surfing, sailing, dog sledding and so on. In the case of e.g. a skier the Microwave Strip Transmission Line Sensor and the Evaluation Unit can be integrated or attached to the ski boot or in the ski boot or the ski itself. With equestrian sports, the sensor and Evaluation Unit can e.g. be attached to a belt around the horses belly or integrated into the saddle. The separate Processing and Display Unit can then be attached to the wrist of the rider.

The present invention favourably also includes:
  means for converting the analog signals of the Microwave Strip Transmission Line Sensor (1) into digital signals
  means for periodically scanning the digital signal, means for converting each periodically scanned signal segment into a Frequency Spectrum A (f),
  means for determining a Frequency Barrier F of the respective current Frequency Spectrum A (f),
  means for calculating the current speed or the traveled distance of the moving user or object from the Frequency Barrier F of the respective current Frequency Spectrum A (f).

The means for converting each of the signal segments into a Frequency Spectrum A (f) preferably comprises means for multiplicating a respective signal segment with a Hamming Window and means for a subsequent Fourier Transformation of the multiplied signal segments. The means for determining the Frequency Barrier F of the respective current Frequency Spectrum A (f) preferably comprises:
  A) means for determining a Threshold Indicator S, with $S<A(f=0)$,
  B) means for comparing the Threshold Indicator S with the Frequency Spectrum A(f), from the frequency f=0 in the direction of ascending frequencies to a predetermined barrier frequency $f_G$,
  C) means for determining a first frequency value $f_1$ at $A(f=f_1)=S$,
  $D_1$) means for determining $f_1$ as the required Frequency Barrier F on the condition A(f) smaller than S for $f_1<f\leq f_G$,
  $D_2$) means for determining a second frequency value $f_2$ et $A(f=f_2)=S$ on the condition A(f) not smaller than S for $f_1<f\leq f_G$,
  E) means for comparing the Threshold Value shortage $d=f_2-f_1$ with fixed values y and z, whereby y<z,
  $F_1$) means for ignoring $f_1$ and $f_2$ and means for further comparing A(f) and S corresponding to the steps (C) et seqq. until barrier frequency $f_G$, on the condition d<y,
  $F_2$) means for not noticing or ignoring the actual Frequency Spectrum A(f) on the condition $y<d\leq z$,
  $F_3$) means for determining $f_1$ as the required Frequency Barrier F on the condition d>z.

Furthermore, the present invention can include means for a plausibility control of the speed values determined from the respective current Frequency Spectrum A(f), comprising:
  means for estimating the acceleration performance of a moving user or object with the relationship:

$P=m(v^2_2-v^2_1)/2\Delta t$ in which m is the mass of the moving user or object; $v_1$ is the speed of the moving user or object determined from the respective preceding Frequency Spectrum $A_1(f)$; $v_2$ is the speed of the moving user or object determined from the current Frequency Spectrum $A_2(f)$ and $\Delta t$ is the time which passes between the scanning of both Frequency Spectrums,
  means for comparing the determined Acceleration Performance P with a fixed upper and a fixed lower acceleration border ($P_{min}$ or $P_{max}$) comprising means for ignoring the speed values $v_2$ on the condition $P<P_{min}$ or $P>P_{max}$, and means for determining $v_2$ as the current speed value on the condition $P_{min}<P<P_{max}$.

The present invention also includes a process for determining the speed or the traveled distance of a moving user or object from the Measurement Signal, which is produced by a Microwave Strip Transmission Line Sensor (1) from one of the inventive devices, in which the process includes the following steps:
  1) conversion of the analog Measurement Signal of a Microwave Strip Transmission Line Sensor into a digital Signal,
  2) periodic scanning of the Digital Signal,
  3) conversion of the periodically scanned signal parts into a respective Frequency Spectrum A(f),
  4) determination of a Frequency Barrier F of the respective current Frequency Spectrum A(f),
  5) calculation of the current speed or traveled distance of the moving user or object from the Frequency Barriers of the Respective Current Frequency Spectrum A(f).

The conversion of the signal parts into a Frequency Spectrum A(f) is advantageously accomplished by the multiplication of a signal portion with a Hamming Window and a subsequent Fourier Transformation of the multiplied signal parts.

The determination of the Frequency Barrier F of the respective current Frequency Spectrum A(f) can be accomplished by the following steps:
  A) determination of a Threshold Indicator S in which $S<A(f=0)$,
  B) comparison of the Threshold Indicator S with the Frequency Spectrum A(f), from the frequency f=0 in the direction of increasing frequency up to a fixed border frequency $f_G$,
  C) determination of a first frequency value $f_1$, with $A(f=f_1)=S$,
  $D_1$) if A(f)<S for $f_1<f\leq f_G$: determine $f_1$ as the required Frequency Barrier F, otherwise D₂) determine a second frequency value $f_2$, with $A(f=f_2)=S$ whereby $f_2>f_1$, E) compare the Threshold Value shortage $d=f_2-f_1$ with fixed values y and z, whereby y<z, F₁) if d<y: ignore $f_1$ and $f_2$, additional comparison of A(f) and S corresponding to steps C) et seqq. until border frequency $f_G$, F₂) if $y<d\leq z$: ignore the current Frequency Spectrum A(f), F₃) if d>z: determination of $f_1$ as the required Frequency Barrier F.

Advantageously, a Plausibility Control of the speed value calculated from the respective current Frequency Spectrum A(f) is carried out in the following steps:

Estimation of the Acceleration Performance of the moving user or object with the relationship:

$$P=m(v^2_2-v^2_1)/2\Delta t$$

in which m is the mass of the moving user or object; $v_1$ is the calculated speed of the moving user or object from the respective preceding Frequency Spectrum $A_1(f)$; $v_2$ is the calculated speed of the moving user or object from the current Frequency Spectrum $A_2(f)$; and $\Delta t$ is the time which passed between the scanning of both Frequency Spectrums, means for comparing the determined Acceleration Performance P with a fixed upper and a fixed lower acceleration border ($P_{may}$ or $P_{min}$):

in case $P<P_{min}$ or $P>P_{may}$: ignore speed value in case $P_{min}<P<P_{max}$: determination of $V_2$ as current speed value.

BRIEF DESCRIPTION OF THE DRAWINGS

The present invention is more closely explained with references to the attached drawings. The figures show.

DETAILED DESCRIPTION OF PREFERRED EMBODIMENTS

Figure 1:
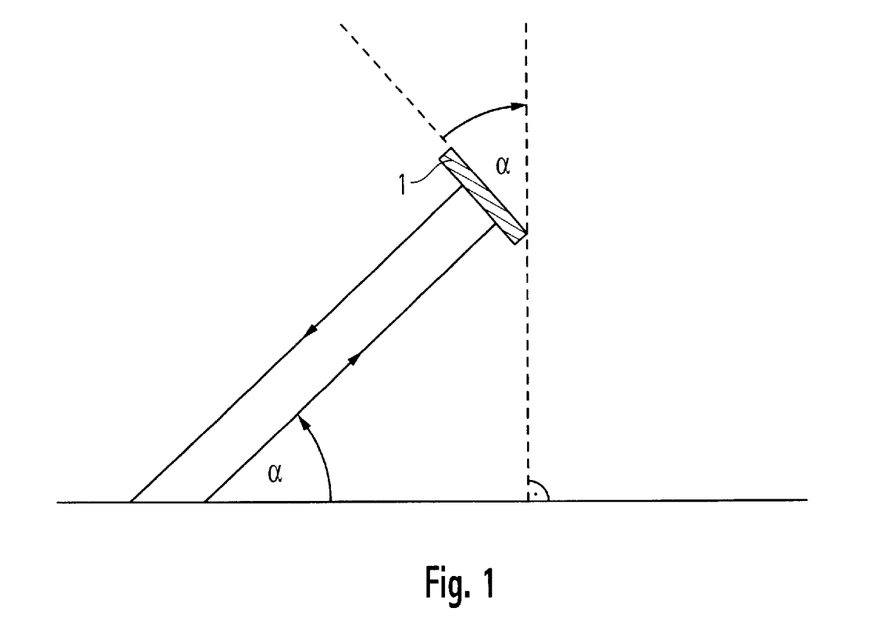
FIG. 1: the functional principle of a Microwave Sensor

FIG. 1 shows a Microwave Sensor sender which is attached to a moving user or object, whose radiation axis is turned by an angle α of between 20° and 60° with respect to the ground normal. The Microwave Sensor used in accordance with the present invention is a Microwave Strip Transmission Line Sensor 1 which includes beams sent at a frequency of 5.8 GHz, a sending and receiving antenna and also a frequency mixer mixing the differential frequency signal between sending and receiving microwave signal into the base band.

Figure 2:
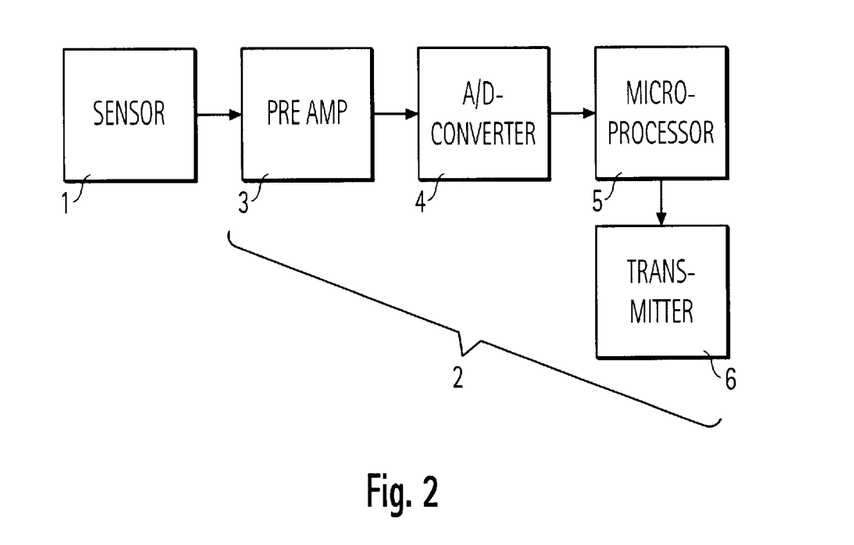
FIG. 2 a block diagram of a Microwave Strip Transmission Line Sensor and an Evaluation Unit according to the present invention

FIG. 2 shows a block diagram of a Microwave Strip Transmission Line Sensor 1 and an Evaluation Unit 2 according to the present invention. The Microwave Strip Transmission Line Sensor delivers an output signal over a preamplifier 2 to an Analog Digital Transformer. The digital data is stored temporarily in microprocessors with RAM or ROM memory and evaluated with regard to speed information and traveled distance. The data is then transferred in consecutive order to Transmitter 6.

Figure 3:
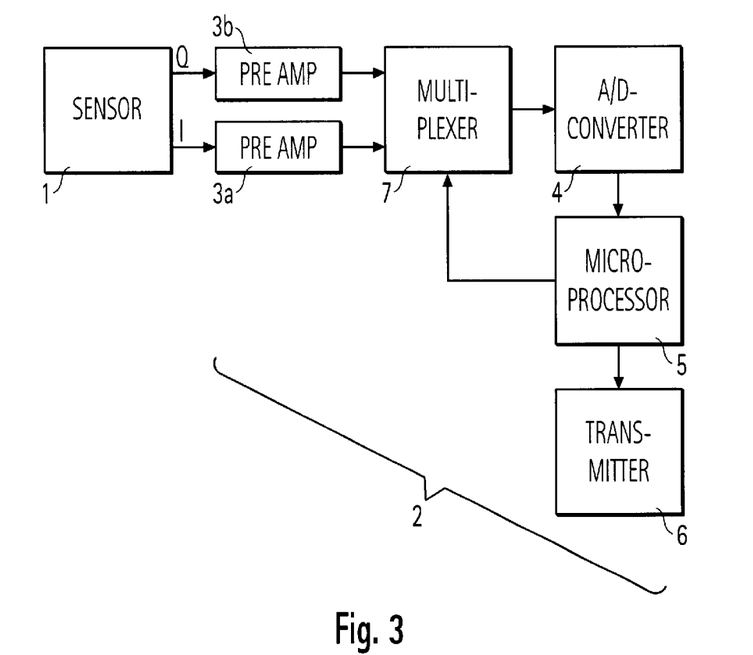
FIG. 3: a block diagram of a preferred embodiment of a Microwave Strip Transmission Line Sensor and an Evaluation Unit according to the present invention

FIG. 3 shows a preferred embodiment of a Microwave Strip Transmission Line Sensor 1 and an Evaluation Unit 2. The Microwave Strip Transmission Line Sensor 1 delivers a complex output signal to both exits I and Q wherein said signal then travels via corresponding preamplifiers 3a and 3b to a Multiplexer 7. A microprocessor 5 with RAM and ROM memory alternately switches I and Q to the Sample and Hold entrance of the Analog Digital Transformer 4. The digitized data is temporarily stored in RAM memory. By means of software programs stored in the ROM the temporarily stored data is evaluated according to its speed of information, preferably by a Fourier Transformation. The frequency value of the speed of the athlete in the Frequency Spectrum is then filtered out, and the speed is then calculated from the frequency information. Another simple process for determining the speed is the Zero Transition Counter. The software also includes filter algorithms to prevent mistakes. In addition, the traveled distance and the average speed from the starting time are calculated. It is possible to determine the step frequency of a user through analysis of the Frequency Spectrum with the Auto Correlation Function. The analyzed data is then sent in consecutive order to a Transmitter 6. The voltage supply of the Microwave Strip Transmission Line Sensor and the Evaluation Unit comes from an accumulator or battery. With a voltage supply of approximately 5 V a transmission output of about 1 mW can be achieved. Two circuit part, e.g. with 3.3 V and 5.0 V, stabilize the current and are switched to stand-by mode via the "shut down entrance" of the Evaluation Unit.

Figure 4:
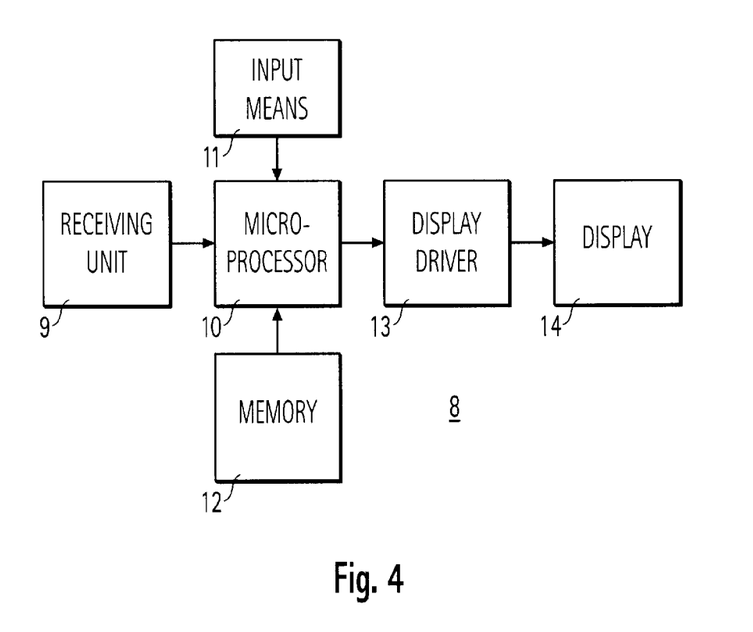
FIG. 4: a block diagram of the separate Processing and Display Unit according to the present invention

FIG. 4 shows a block diagram of a separate Processing and Display Unit 8 according to the present invention. A receiving unit 9 receives the transferred data from Transmitter 6 of the Evaluation Unit 2, and sends them over a serial interface to a microprocessor 10 with RAM and ROM memories. The data is temporarily stored in a RAM memory. The data to be sent to a display driver 13 and to be displayed on the display 14 is selected via a keyboard or operating buttons 11. This display can e.g. be a LCD display. Additional functions such as clock functions can be stored in the ROM memory by a special software program when the Processing and Display Unit is attachable to the user as a wrist band.

In a different embodiment, the Processing and Display Unit, 8, is stationary. It can, for example, be attached to a computer through which the received data can be processed, stored or reported according to different categories.

Figure 5A:
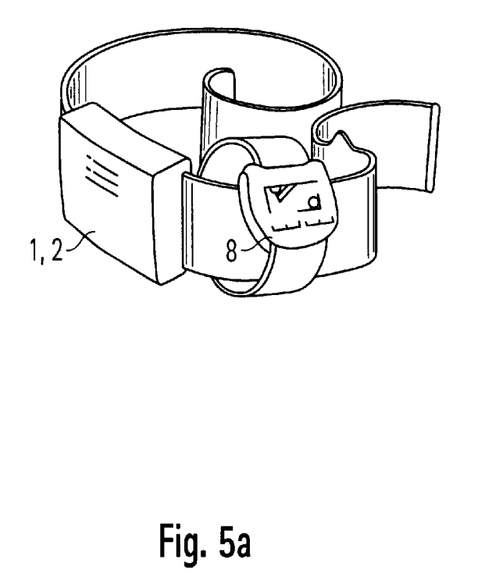
FIGS. 5a and 5b: possible application of the present invention.
Figure 5B:
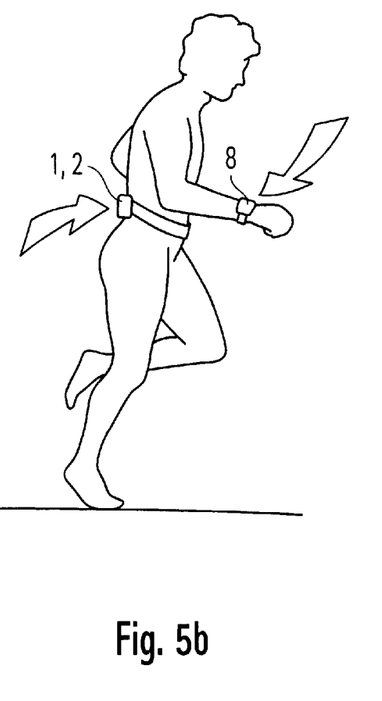

FIGS. 5a and 5b shows the possible use of the present invention by a runner. The Microwave Strip Transmission Line Sensor, 1, and the Evaluation Unit, 2, are attached to the hip of a runner by an elastic belt, which is made of plastic. The sensor is turned by a fixed angle with respect to the ground normal, for example 30°. Since the belt is made from an elastic material, it nestles to the body and prevents the Microwave Strip Transmission Line Sensor to slip, shake or change position in any other way during running or walking. The separate Processing and Display Unit 8 is attached to the wrist of a runner or walker, by a wrist band or the like. This enables the moving user to check his own speed and traveled distance during running. Since it is of a small size and light weight, the present invention does not interfere or disrupt movement.

An explanation of the invented processes to determine speed and traveled distance of a moving user or object from a measuring signal, which is produced by a Microwave Strip Transmission Line Sensor 1 of the previously described unit is given in the following paragraphs with reference to FIGS. 6 through 9.

The Microwave Strip Transmission Line Sensor, 1, produces a complex time signal (real and imaginary parts), whose spectral content depends on the speed of the user or object and the composition of the ground. To prevent disruptions through movement, it is preferred to first highpass filter the signal by a Rumpel Filter and afterwards lowpass filter it with an Anti-Aliasing Filter.

The analog Sensor Signal is then converted in an Analog Digital Converter 4 with a fixed scanning rate. From the constant digital Signal, small periodic portions undergo a spectral examination. For this, the signal portions are multiplied by a Hamming Window or a Hamming Function and then Fourier transformed. The Hamming Window or the Hamming Function is used to weaken and equalize the beginning and the end of the continous spectrum, since with the Fourier Transformation it is assumed that the transformed spectrum is continous. In the above example, the spectrum is not constant, but is made of small portions which are periodically scanned from the continous spectrum and whose beginning and end are different. A Fourier Transformation without previous multiplication with a Hamming Window would produce a big break in the spectrum.

Figure 6:
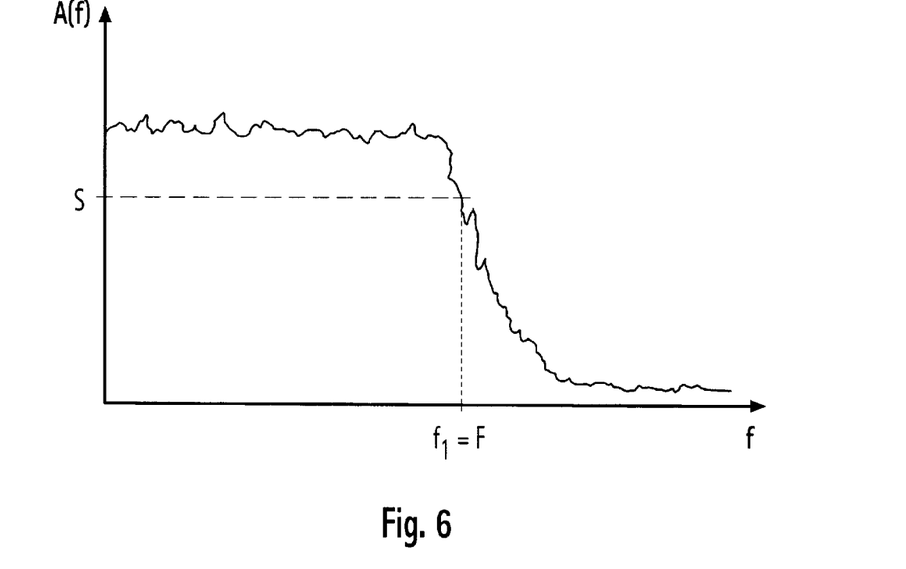
FIGS. 6 through 9: examples of the Frequency Spectrums produced by the inventive process to determine the speed of the user or object

FIG. 6 shows a typical spectrum after the multiplication with a Hamming Window and a Fourier Transformation. The spectrum, A(f), decreases with increasing frequency, f. At a specific frequency, only noise can be heard which is produced through a preamplifier and the quantising. This Frequency Barrier F is useful as a measurement and to calculate speed values. To determine the Frequency Barrier, F, a Threshold Indicator, S, is defined. The sum spectrum is evaluated from zero hertz to increasing frequency until a barrier frequency. The barrier frequency is typically determined with or through a Fourier Transformation. If the spectrum, A(f), sinks below the Threshold Indicator, S, and the spectrum, A(f), remains <S for $f_1 < f \leq f_G$, at this point, A(f)=S, the Frequency Barrier $F=f_1$ is reached. F is fixed as a Frequency Barrier and used to calculate the speed or distance. This is shown in FIG. 6.

Figure 7:
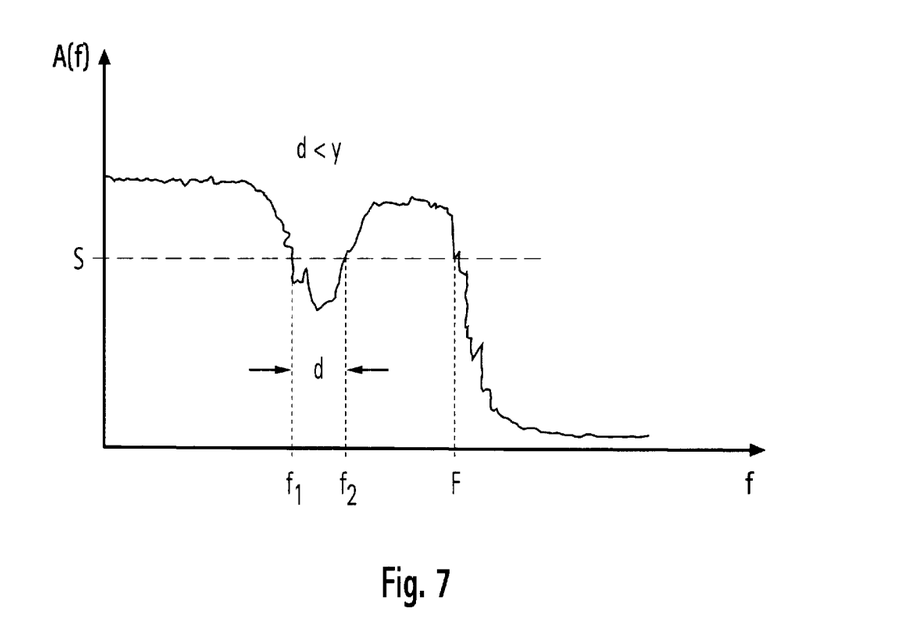

To prevent erroneous measurement caused by occasional minimal values which fall under the Threshold Indicators it is evaluated, if the spectrum, A(f), exceeds the Threshold Indicator S, with higher frequencies. If this happens the frequency $f_2$ in which $A(f_2)=S$, is determined as second frequency value as shown in FIG. 7. Then, the Threshold value shortage d=f2−f1 is determined. This Treshold value shortage d is compared with fixed values y and z., whereby y<z. If d<y, then f1 and f2 are ignored or discarded and the spectrum is evaluated for the real Frequency Barrier F according to the above steps until the frequency border. This case is shown in FIG. 7.

Figure 8:
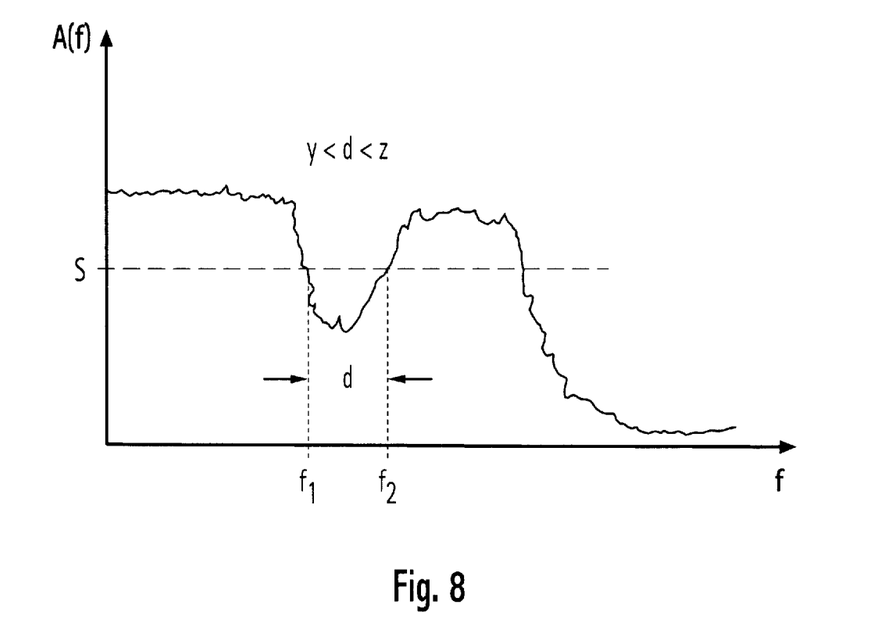
Figure 9:
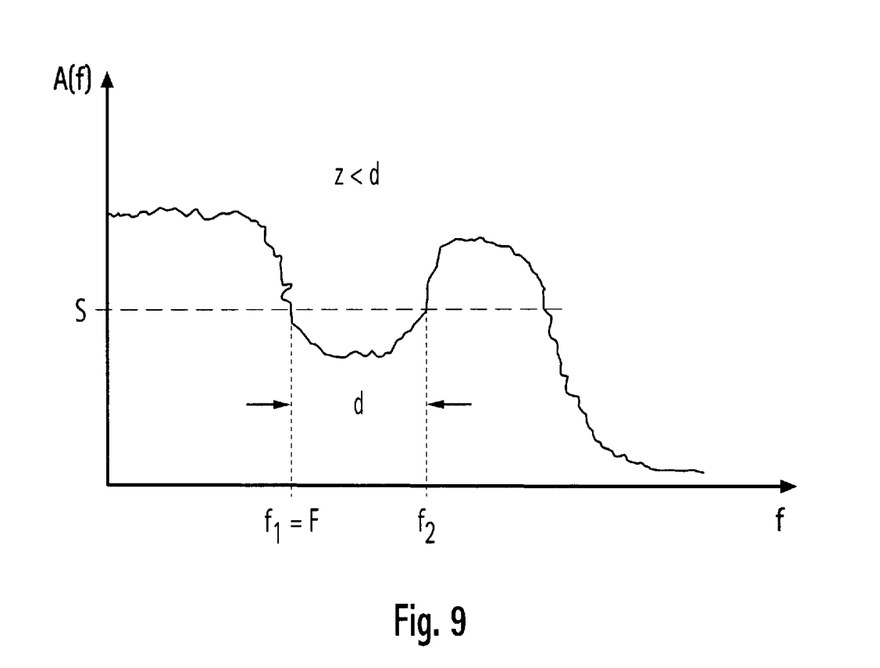

If the Threshold Value shortage d lies between the values y and z, for instance y<d<z, like in FIG. 8, there is no Frequency Barrier determined, but the whole spectrum is discarded or ignored and the next spectrum is evaluated. The Frequency Barrier can then be determined from the previous or following spectrum. In FIG. 9 a case is shown, in which the Threshold Value shortage d is larger then the value z, for instance d<z. In this case, $f_1$ is the Frequency Barrier, F.

If the Frequency Barrier has been determined by the above procedure, the speed, v, of the user or object is determined through multiplication of the Frequency Barrier, F, with a previously determined calibration factor. The speed value is then sent to a transmitter, 6, which then transmits it to the Processing and Display Unit, 8. From the speed value and the measuring interval, partial distances can be calculated, which will be continuously added to the already traveled distance. The calculation of speed values and/or traveled distance can also take place in the Processing and Display Unit, 9.

The reliability of the process and the calculated speed values is also increased by the use of a Plausibility Control of the speed values. Hereby, the reduction of interfering influences, such as moving hurdles which are in the sensor range can be accomplished. For this, the kinetic energy E of the user or object is roughly estimated in accordance with the relationship $E=mv^2/2$. The estimation is approximate because the mass m of the user or object is not exactly known. From the kinetic energy $E_1$, from preceding speed value measurement, the kinetic energy $E_2$ of the current speed value measurement, and the time Δt used in between, the delivered acceleration performance $P=(E_2-E_1)/\Delta t$ is estimated. Negative acceleration performance can be indicated by delaying performance. If the determined acceleration performance exceeds an fixed maximum acceleration performance $P_{max}$, or falls below an fixed minimum acceleration performance $P_{min}$, for instance $P<P_{min}$, the current speed value is not possible, in other words, is ignored.

What is claimed is:

1. A unit for measuring speed and traveled distance of a moving user or object through the intermediary of a Doppler radar sensor, wherein said Doppler radar sensor is attached to the moving user or object and consists of a strip transmission line sensor operating in a microwave range (1), which produces and transmits measuring signals; an evaluation unit for receiving said transmitted signals from said strip transmission line sensor, said evaluation unit (2) comprising a transmitter for the transmission of evaluated data; and a processing and display unit (8) for receiving said evaluated data.

2. A unit according to claim 1, wherein said processing and display unit (8) comprises a separate transportable component.

3. A unit according to claim 2, wherein said separate processing and display unit (8) is fastened to the moving user with a wrist band.

4. A unit according to claim 1, wherein said processing and display unit is a separate and stationary component.

5. A unit according to claim 1, wherein said strip transmission line sensor (1) and evaluation unit (2) are located in a casing which is selectively attached to the moving user or object with an elastic belt, buckle, or a clip attached to the casing.

6. A unit according to claim 5, wherein said strip transmission line sensor (1) is located in the casing such that radiation emitted therefrom strikes the ground at an angle when the casing is attached to the user or object.

7. A unit according to claim 1, wherein said evaluation unit (2) comprises at least one preamplifier (3), and A/D converter (4), a microprocessor (5) with RAM and ROM memories, and a transmitter (6).

8. A unit according to claim 1, wherein said evaluation unit (2) includes a multiplexer (7).

9. A unit according to claim 1, wherein said processing and display unit (8) comprises a receiving unit (9), as a microprocessor (10) with RAM and ROM memories, and an evaluation unit (14).

10. A unit according to claim 1, wherein said strip transmission line sensor (10) possesses a transmitting frequency of 5.8 GHz.

11. A unit according to claim 1, wherein said strip transmission line sensor (1) and the evaluation unit (2) are combined with an acceleration sensor so as to turn off the strip transmission line sensor when the speed of the user or object remains constant.

12. A unit according to claim 1, wherein said strip transmission line sensor (1) and said evaluation unit (2) are combined with a pressure sensor so as to compensate of errors in measurement caused by changes in altitude.

13. A unit according to claim 1, comprising means for converting the analog measuring signals produced by the strip transmission line sensor into digital signals;

means for converting the analog measuring signals produced by the strip transmission line sensor into digital signals;

means for periodically scanning the digital signals;

means for transforming the periodically scanned signal portions into a respective frequency spectrum A (f);

means for determining a frequency barrier F of the respective current frequency spectrum A (f); and means for calculating the current speed or traveled distance of the moving user or object from the frequency barrier F of the respective current frequency spectrum A(f).

14. A unit according to claim 13, wherein said means for transforming the signal portions into a respective frequency spectrum A (f) comprises means for multiplying the respective signal portions with a hamming window and means for a subsequent Fourier transformation of the multiplied signal portions.

15. A unit according to claim 13 or 14, wherein said means for determining the frequency barrier F of the respective current frequency spectrum A (f) comprises:

a) means for determining a threshold indicator S, whereby S<A (f=0);

b) means of comparing the threshold indicator S, with a frequency spectrum A (f) from the frequency f=0 in the direction of increasing frequencies up to a predetermined barrier frequency $f_g$;

c) means for determining a first frequency value $f_1$ at A $(f=f_1)=S$;

$d_1$) means for determining $f_1$ as the required frequency barrier F on the condition A (f)<S for $f_1<F \leq f_G$;

$d_2$) means for determining a second frequency value $f_2$ at A$(f=f_2)=S$ on the condition A(f) not smaller than S for $f_1<f \leq f_G$;

e) means for comparing the threshold value shortage d=$f_2-f_1$ with fixed values y and z, whereby y<z;

$f_1$) means for ignoring $f_1$ and $f_2$, and means for further comparing A (f) and S according to the steps c) et seq. up to the barrier frequency $f_G$, on the condition d<y;

$f_2$) means for ignoring the current frequency spectrum A (f) on the condition y<d$\leq$z; and $f_3$) means for determining $f_1$ as the required frequency barrier F on the condition d>z.

16. A unit according to claim 15, wherein there are provided means for a plausibility control of the speed values calculated from the respective current frequency spectrum A(f), comprising;

means for estimating the acceleration performance of the moving user or object by means of the equation:

$$P=m(v^2_2-v^2_1)/2\Delta t$$

where m is the mass of the moving user or object, $v_1$ is the speed of the moving user or object calculated from the respective preceding frequency spectrum $A_1$(f), $v_2$ is speed of the moving user or object calculated from the current frequency spectrum $A_2$(f), and $\Delta t$ is the used up time between the scanning of both frequency spectrums; and means for comparing the determined acceleration performance P with a fixed upper and lower acceleration border ($P_{max}$ or $P_{min}$) including:

means for ignoring the speed value $v_2$ on the condition P<$P_{min}$ or P>$P_{max}$, and means for determining $v_2$ as the current speed value on the condition $P_{min}$<P<$P_{max}$.

17. A process for determining the speed or traveled distance of a moving user or object from measurement signals produced by a strip transmission line sensor operating in a microwave range (1) which consists of a unit comprising a Doppler radar sensor, comprising the steps of:

converting the analog measurements signals produced by the strip transmission line sensor (1) into digital signals;

effecting periodic scanning of the digital signals;

transforming each of the periodically scanned signal portion into a frequency spectrum A(f);

determining a frequency barrier F of the respective current frequency spectrum A (f); and calculating the current speed or traveled distance of the moving user or object from the frequency barrier F of the respective current frequency spectrum A(f).

18. A process according to claim 17, wherein the transformation of the signal portions into respective frequency spectrums A (f) is achieved by a multiplication of the respective signal portions with a hamming window and a subsequent Fourier transformation of the multiplied signal parts.

19. A process according to claim 17 or 18, wherein the determination of the frequency barrier F of the respective current frequency spectrum A(f) is achieved by the following steps:

a) determining a threshold indicator S, whereby S<A(f=0)

b) comparing the threshold indicator S with the frequency spectrum A(f) from the frequency f=0 in the direction of increasing frequencies up to a predetermined frequency $f_G$, c) determining a first frequency value $f_1$ at A (f=$f_1$)=S, $d_1$) when is A(f)<S for $f_1<f \leq f_G$: determining $f_1$ as the required frequency barrier F, or alternatively $d_2$) determining a second frequency value $f_2$ at A(f=$f_2$)=S, whereby $f_2>f_1$, e) comparing the threshold value shortage d=$f_2-f_1$ with fixed values y and z, whereby y<z:

$f_1$) if d<y: ignore $f_1$ and $f_2$, further comparison of A(f) and S according to the steps c) et seq. up to barrier frequency $f_G$, $f_2$) if y<d$\leq$z: ignore the current frequency spectrum A(f), $f_3$) if d>z: determine $f_1$ as the required frequency barrier F.

20. A process according to claim 19, wherein the calculated speed value from the respective current frequency spectrum A(f) is subjected to a plausibility control with the following steps:

estimation of the acceleration performance of the moving user or object according to the equation:

$$P = m(v^2_2 - v^1_2)/2\Delta t$$

where m is the mass of the moving user or object, $v_1$ is the speed of the moving user or object calculated from the respective preceding frequency spectrum $A_1(f)$, $v_2$ is the speed of the moving user or object calculated from the current frequency spectrum $A_2(f)$, and $\Delta t$ is the time passed between the scanning of both frequency spectrums, and comparing the determined acceleration performance P with a fixed upper and a fixed lower acceleration barrier ($P_{max}$ or $P_{min}$):

if $P<P_{min}$ or $P>P_{max}$: ignore the speed value $v_2$, if $P_{min}$ $P<P_{max}$: determine $v_2$ as the current speed value.

* * * * *